US007251669B1

(12) United States Patent
Arora

(10) Patent No.: US 7,251,669 B1
(45) Date of Patent: Jul. 31, 2007

(54) SYSTEM AND METHOD FOR DATABASE VERSIONING

(75) Inventor: Siddhartha Cingh Arora, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 477 days.

(21) Appl. No.: 10/403,618

(22) Filed: Mar. 31, 2003

(51) Int. Cl.
*G06F 17/30* (2006.01)

(52) U.S. Cl. .................. 707/202; 707/203; 707/204

(58) Field of Classification Search ............. 707/202, 707/203, 204
See application file for complete search history.

(56) References Cited

U.S. PATENT DOCUMENTS

| | | | | |
|---|---|---|---|---|
| 4,506,326 | A * | 3/1985 | Shaw et al. ..................... | 707/4 |
| 4,714,996 | A * | 12/1987 | Gladney et al. ............ | 707/203 |
| 5,280,612 | A * | 1/1994 | Lorie et al. ..................... | 707/8 |
| 6,393,437 | B1 * | 5/2002 | Zinda et al. ................. | 707/201 |
| 6,615,223 | B1 * | 9/2003 | Shih et al. ................... | 707/201 |
| 7,013,315 | B1 * | 3/2006 | Boothby ...................... | 707/203 |

OTHER PUBLICATIONS

Cohen, D. "Compiling Complex Database Transition Triggers", *ACM*, 1989, 225-234.
Conradi, R. et al., "Version Models for Software Configuration Management", *ACM Computing Surveys*, Jun. 1998, 30(2), 232-282.
Dayal, U. et al., "Organizing Long-Running Activities with Triggers and Transactions", *ACM*, 1990, 204-214.
Eswaran, K.P. "Aspects of a Trigger Subsystem in an Integrated Database System", *IBM Research Laboratory*, San Jose, 243-250.
Katz, R.H. "Toward a Unified Framework for Version Modeling in Engineering Databases", *ACM Computing Surveys*, Dec. 1990, 22(4), 375-408.
Raschid, L., et al. "Semantics for Update Rule Programs and Implementation in a Relational Database Management System", *ACM Transactions on Database Systems*, Dec. 1996, 22(4), 526-271.
Sciore, E. "Using Annotations to Support Multiple Kinds of Versioning in an Object-Oriented Database System", *ACM Transactions on Database Systems*, Sep. 1991, 16(3), 417-438.

* cited by examiner

*Primary Examiner*—Apu Mofiz
*Assistant Examiner*—Monica Pyo
(74) *Attorney, Agent, or Firm*—Woodcock Washburn LLP

(57) ABSTRACT

A committed version of a data table is stored in a base table that includes a timestamp column that indicates when the most recent change to each row was committed. Changes to the base table are stored in three versioned tables: a version add table, a version modify table, and a version delete table. A version view table reconstructs the data stored in the base table and the versioned tables to provide an external view of each version. When a change is made, the change is stored in the appropriate versioned table with the corresponding timestamp from the base table. When the change is submitted, the "stored" timestamp in the versioned table is compared with the "current" timestamp in the base table. If the stored timestamp is equal to the current timestamp, then there is no conflict and the change is committed. If the stored timestamp is not equal to the current timestamp, then there is a conflict. A user may choose to merge and commit a conflict or to rollback and not commit the conflicting.

17 Claims, 3 Drawing Sheets

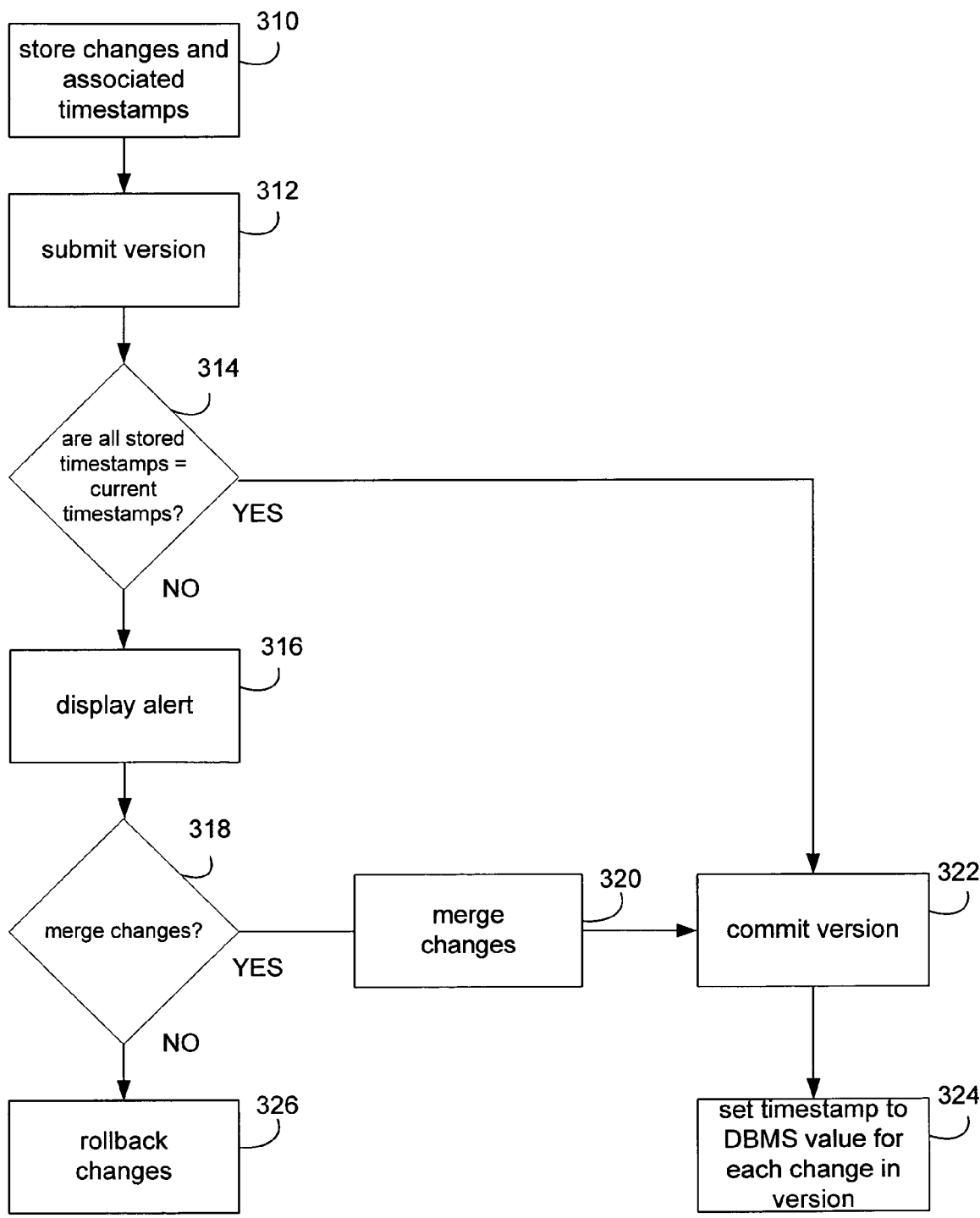

SYSTEM AND METHOD FOR DATABASE VERSIONING

BACKGROUND OF THE INVENTION

1. Field of the Invention

The present invention is directed to the field of database management, and, more specifically, to storing multiple versions of data and resolving conflicts between such versions.

2. Description of the Prior Art

Database management systems (DBMS) enable multiple users to view and change data. For example, users may insert, modify, or delete rows in a data table. In conventional DBMS's, changes are generally committed to the DBMS at the time they are made. Once changes are committed they may be viewed by other users. It is often desirable, however, for a user to make changes without immediately committing the changes. For example, a user may wish to make changes without having the changes visible to other users until the changes have been verified. Thus, there is need for systems and methods to store multiple "versions" of a DBMS, whereby each user may make changes only visible in the user's particular version until the user commits the changes.

Related to the concept of database versioning is the concept of conflict resolution. A conflict occurs when two users change the same data element. For example, a first user may "check out" a first version. While the first version is checked out, the first user may modify a particular row of a data table. Before the first version is "checked in", a second user may check in a second version in which the same row modified by the first user has been deleted. When the first user checks in the first version, a conflict will occur.

It is desired that database versioning systems in accordance with the present invention enable such conflicts to be efficiently detected and resolved. It is desired that users be alerted to such conflicts and that users have the ability to resolve such conflicts.

SUMMARY OF THE INVENTION

Accordingly, systems and methods for database versioning are disclosed. A committed version of each data table in a database management system is stored in a base table. Each versioned base table has a set of three corresponding versioned tables: a version add table, a version modify table, and a version delete table. The version add table stores rows added to the base table in each version, the version modify table stores rows modified in the base table in each version, and the version delete table stores rows deleted from the base table in each version. Each version has a version view table that reconstructs the data stored in the base table and the versioned tables to provide an external view of the corresponding version.

In addition to a corresponding set of versioned tables, each versioned base table has a timestamp column. The timestamp is preferably a value that is maintained by the database management system. When a change is committed to the base table, the change is "stamped" with the timestamp value. When a change is made, the change is stored in the appropriate versioned table with its corresponding timestamp from the base table. If, when the change is submitted, the "stored" timestamp in the versioned table is equal to the "current" timestamp in the base table, then there is no conflict and the change is committed. If, however, the stored timestamp is not equal to the current timestamp, then there is a conflict.

When conflicts are detected, an alert may be displayed to a user notifying the user of the conflicts. The user may choose to merge and commit the conflicting changes. The user may also choose to rollback and not commit the conflicting changes. The database management system may also be preset to automatically merge changes or to rollback changes.

BRIEF DESCRIPTION OF THE DRAWINGS

The illustrative embodiments will be better understood after reading the following detailed description with reference to the appended drawings, in which:

FIG. 3 is a flowchart of an exemplary conflict resolution method in accordance with the present invention.

DETAILED DESCRIPTION

Figure 1:
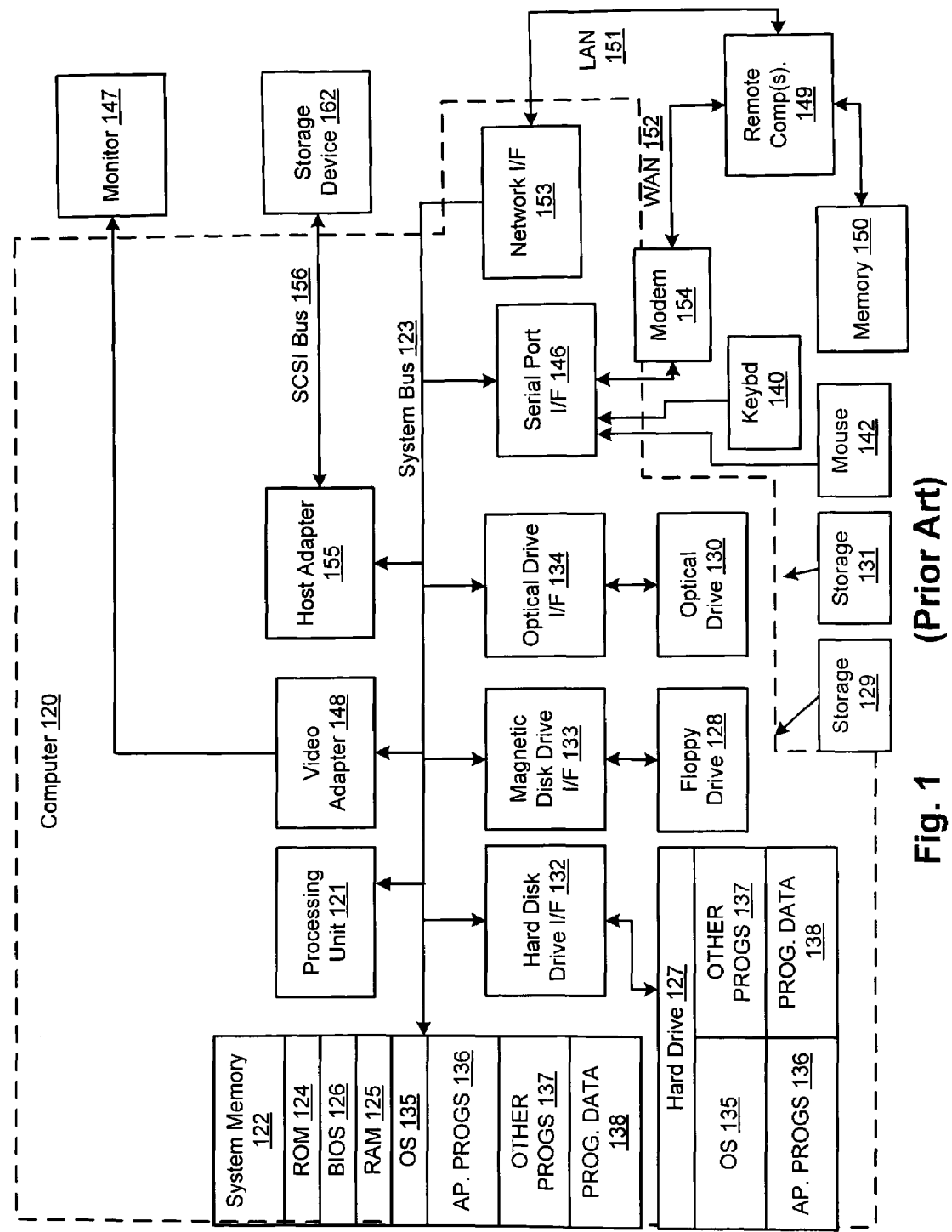
FIG. 1 is a block diagram representing a general purpose computer system in which aspects of the present invention and/or portions thereof may be incorporated.

Systems and methods that meet the above-mentioned objects and provides other beneficial features in accordance with the presently preferred exemplary embodiments of the invention will be described below with reference to aforementioned Figures. Those skilled in the art will readily appreciate that the description given herein with respect to those figures is for explanatory purposes only and is not intended in any way to limit the scope of the invention. Throughout the description, like reference numerals will refer to like elements in the respective figures.

Computer Environment

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142 such as a mouse. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Exemplary Systems and Methods of the Present Invention

Generally, a committed version of a data table is stored in a base table. Changes to the base table are stored in three versioned tables: a version add table, a version modify table, and a version delete table. The version add table stores rows added to the base table in each version, the version modify table stores rows modified in the base table in each version, and the version delete table stores rows deleted from the base table in each version. A version view table reconstructs the data stored in the base table and the versioned tables to provide an external view of each version.

Figure 2:
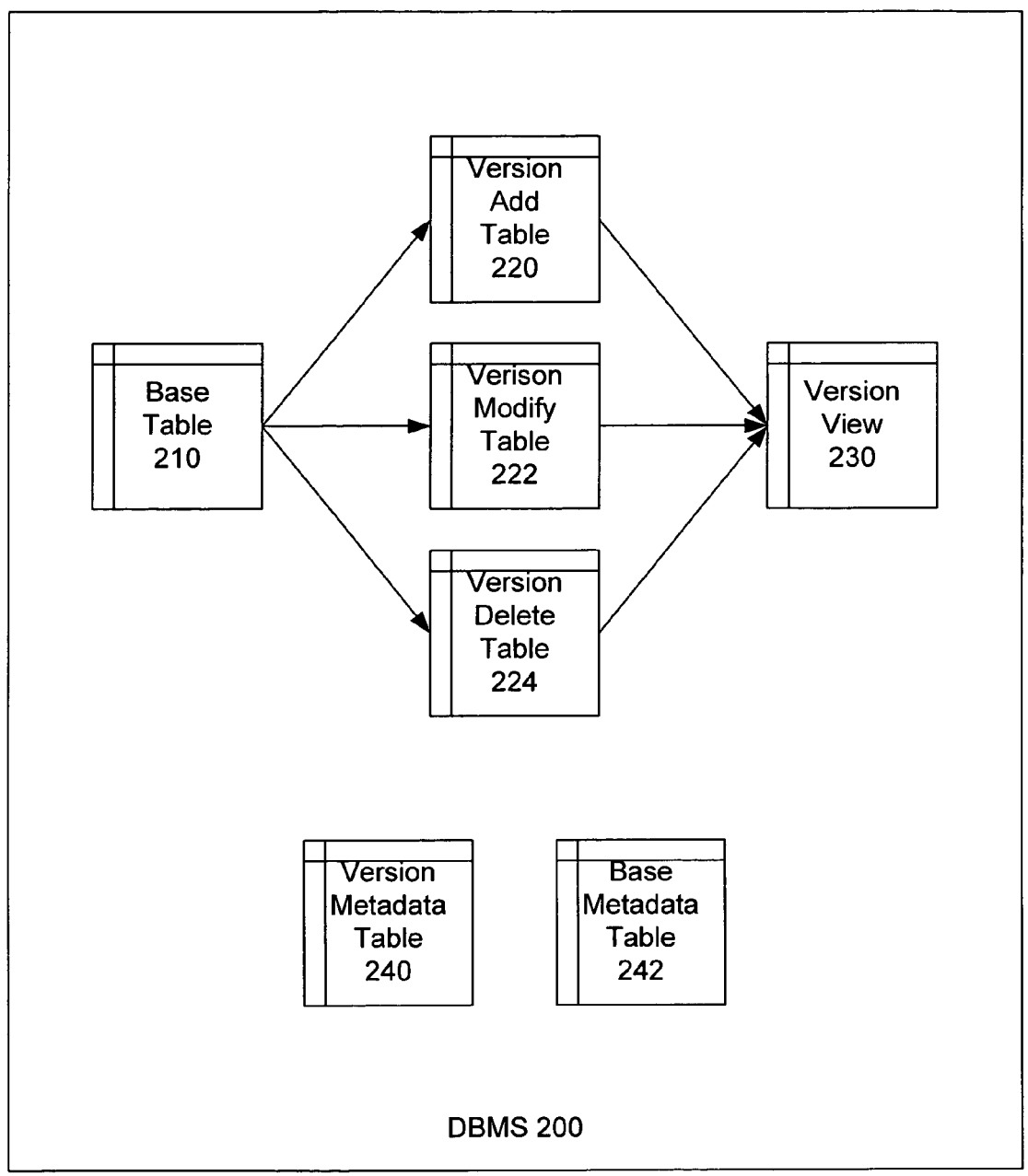
FIG. 2 is a block diagram of an exemplary database versioning system in accordance with the present invention.

A block diagram of an exemplary database versioning system in accordance with the present invention is shown in FIG. 2. Database Management System (DBMS) 200 includes base table 210, versioned tables 220-224, version view table 230, and metadata tables 240 and 242. Versioned tables 220-224 include version add table 220, version modify table 222, version delete table 224. Metadata tables 240 and 242 include version metadata table 240 and base metadata table 242.

As shown in FIG. 2, base table 210 stores a committed version of a data table. As should be appreciated, although only a single base table 210 is shown, DBMS 200 may include any number of additional base tables. As should further be appreciated, although base table 210 is versioned, not every base table stored at DBMS 200 need be versioned.

Each versioned base table includes "data" columns and a "timestamp" column. The data columns store substantive data. The timestamp column stores a value that indicates when the most recent change to each row was committed. When a change is committed to base table 210, the change is stamped with the timestamp value. The timestamp is preferably a value that is automatically maintained by DBMS 200. The timestamp is preferably a hexadecimal number. An exemplary base table 210 at timestamp 0x0003 is shown below in Table 1:

TABLE 1

Exemplary Base Table (at Timestamp = 0x0003)

| BUYER ID | NAME | CITY | TIMESTAMP |
| --- | --- | --- | --- |
| 100 | Dianne | Detroit | 0x0002 |
| 101 | Sam | Seattle | 0x0002 |
| 102 | Charles | Chicago | 0x0002 |
| 103 | Betty | Boston | 0x0002 |

As shown in Table 1 above, base table 210 includes data columns (buyer ID, name, city) and a timestamp column. As indicated by the timestamp column, rows 100-103 were committed to base table 210 at timestamp 0x0002.

Versioned tables 220-224 store changes made to base table 210. When a change is made, the change is stored in the appropriate versioned table 220-224 with the timestamp of the row from base table 210. Only base tables that are versioned will have a corresponding set of versioned tables 220-224. Versioned tables 220-224 are preferably implemented using trigger procedures stored in and managed by DBMS 200. DBMS 200 automatically fires the triggers as a result of a change to a data element in a base table that is versioned.

Version add table 220 stores rows added to each version of base table 210. An exemplary version add table 220 at timestamp 0x0007 is shown below in Table 2:

TABLE 2

Exemplary Version Add Table (at Timestamp = 0x0007)

| BUYER ID | NAME | CITY | TIME-STAMP | TIME | VERSION ID |
|---|---|---|---|---|---|
| 100 | Dianne | Detroit | 0x0000 | Jan. 1, 2003 1:00 a.m. | 1 |
| 101 | Sam | Seattle | 0x0000 | Jan. 1, 2003 1:00 a.m. | 1 |
| 102 | Charles | Chicago | 0x0000 | Jan. 1, 2003 1:00 a.m. | 1 |
| 103 | Betty | Boston | 0x0000 | Jan. 1, 2003 1:00 a.m. | 1 |
| 104 | Mike | Miami | 0x0000 | Jan. 1, 2003 2:00 a.m. | 2 |
| 105 | Phil | Philadelphia | 0x0000 | Jan. 1, 2003 7:00 a.m. | 3 |

As shown in Table 2 above, version add table 220 includes each column in base table 210. The data columns (buyer ID, name, city) include the added data row. The timestamp column value for each row is zero because added rows have not been previously committed to base table 210. Version add table 220 also includes a Time column, which stores the date and time that each row is added, and a Version ID column, which stores an identifier of the version to which each row is added.

Version modify table 222 stores rows modified in each version of base table 210. An exemplary version modify table 222 at timestamp 0x0007 is shown below in Table 3:

TABLE 3

Exemplary Version Modify Table (at Timestamp = 0x0007)

| BUYER ID | NAME | CITY | TIMESTAMP | TIME | VERSION ID |
|---|---|---|---|---|---|
| 102 | Charles | Portland | 0x0002 | Jan. 1, 2003 4:00 a.m. | 3 |
| 102 | Charles | Denver | 0x0002 | Jan. 1, 2003 5:00 a.m. | 2 |

As shown in Table 3 above, version modify table 222 includes each column in base table 210. The data columns (buyer ID, name, city) include the modified data row. The timestamp column includes the timestamp of each row from base table 210 when the row is made. Version modify table 222 also includes a Time column, which stores the date and time that each row is modified, and a Version ID column, which stores an identifier of the version in which each row is modified.

Version delete table 224 stores rows deleted from each version of base table 210. An exemplary version delete table 224 at timestamp 0x0008 is shown below in Table 4:

TABLE 4

Exemplary Version Delete Table (at Timestamp = 0x0007)

| BUYER ID | NAME | CITY | TIMESTAMP | TIME | VERSION ID |
|---|---|---|---|---|---|
| 100 | Dianne | Detroit | 0x0002 | Jan. 1, 2003 3:00 a.m. | 2 |
| 101 | Sam | Seattle | 0x0002 | Jan. 1, 2003 7:00 a.m. | 3 |

As shown in Table 4 above, version delete table 224 includes each column in base table 210. The data columns (buyer ID, name, city) include the deleted data row. The timestamp column includes the timestamp of each row from base table 210 when the row is deleted. Version delete table 224 also includes a Time column, which stores the date and time that each row is deleted, and a Version ID column, which stores an identifier of the version in which each row is deleted.

Version view table 230 reconstructs the data stored in base table 210 and versioned tables 220-224 to provide an external view of each corresponding version. As should be appreciated, although only a single version view table 230 is shown in FIG. 2, DBMS 200 may include any number of version view tables each corresponding to a version of base table 210. Two exemplary version view tables 230 at timestamp=0x0007 corresponding to versions 2 and 3 of exemplary base table 210 are shown below in tables 5 and 6, respectively:

TABLE 5

Exemplary View Table of Version 2 (at Timestamp = 0x0007)

| BUYER ID | NAME | CITY |
|---|---|---|
| 101 | Sam | Seattle |
| 102 | Charles | Portland |
| 103 | Betty | Boston |
| 104 | Mike | Miami |

TABLE 6

Exemplary View Table of Version 3 (at Timestamp = 0x0007)

| BUYER ID | NAME | CITY |
|---|---|---|
| 100 | Dianne | Detroit |
| 102 | Charles | Denver |
| 103 | Betty | Boston |
| 105 | Phil | Philadelphia |

As shown in Tables 5-6 above, version view table 230 provides an external view of each version of base table 210 including data columns (buyer ID, name, city).

When a version is submitted, all changes made in the version are preferably submitted in a single transaction. For example, at timestamp=0x0008, the changes made in version 2 may be committed to base table 210. As shown in tables 2-4 above, such changes include the addition of row 104, the modification of row 102, and the deletion of row 100. An exemplary base table 210 at timestamp 0x0008 after version 2 has been committed is shown below in Table 7:

TABLE 7

Exemplary Base Table (at Timestamp = 0x0008)

| BUYER ID | NAME | CITY | TIMESTAMP |
|---|---|---|---|
| 100 | | | 0x0008 |
| 101 | Sam | Seattle | 0x0002 |
| 102 | Charles | Portland | 0x0008 |
| 103 | Betty | Boston | 0x0002 |
| 104 | Mike | Miami | 0x0008 |

As shown in Table 7 above, the changes made in version 2 have been committed to base table 210. The timestamp of the changed rows is set to 0x0008 to reflect the timestamp value when the changes were committed. The data columns for row 100 are empty because the row has been deleted.

In addition to data tables 210-230, DBMS 200 may also include metadata tables 240-242 that store information corresponding to tables that are versioned. For example, version metadata table 240 may store information corresponding to versions of a versioned base table. An exemplary version metadata table 240 at timestamp 0x0008 is shown below in Table 8:

TABLE 8

Exemplary Version Metadata Table (at Timestamp = 0x0008)

| VERSION ID | NAME | USER ID | STATE | DESCRIPTION | CHANGE TIME | ROW CREATE TIME |
|---|---|---|---|---|---|---|
| 1 | Green | A | Committed | Corrections from Green Folder | Jan. 1, 2003 1:00 a.m. | Jan. 1, 2003 1:00 a.m. |
| 2 | Blue | B | Committed | Corrections from Blue Folder | Jan. 1, 2003 5:00 a.m. | Jan. 1, 2003 2:00 a.m. |
| 3 | Red | A | Open | Corrections from Red Folder | Jan. 1, 2003 7:00 a.m. | Jan. 1, 2003 4:00 a.m. |

As shown in Table 7 above, version metadata table 240 may include seven columns: Version ID, Name, User ID, State, Description, Change Time, and Row Create Time. The Version ID column stores an identifier of each version of the versioned table. The Name column stores a unique name of each version. The User ID column stores an identifier of the user who operates each version. The State column indicates whether each version is open or committed. The Description column stores a user description of the version. The Change Time stores the date and time when the version information for each version was last changed. The Row Create Time column stores the date and time when each version was created.

In addition to version metadata table 240, a base metadata table 242 may be used to store information about each base table that is versioned. An exemplary base metadata table 242 at timestamp 0x0008 is shown below in Table 9:

TABLE 9

Exemplary Base Metadata Table (at Timestamp = 0x0008)

| TABLE ID | TABLE NAME | COLUMN NAME | CHANGE TIME | ROW CREATE TIME |
|---|---|---|---|---|
| 210 | Buyers | Buyer ID | Jan. 1, 2003 8:00 a.m. | Jan. 1, 2003 1:00 a.m. |

As shown in Table 8 above, the base metadata table 242 may include five columns: Table ID, table Name, Column Name, Change Time, and Row Create Time. The Table ID column stores an identifier of each versioned table. The Table Name column stores a unique name of each versioned table. The Column Name column stores the name of the primary key column of each versioned table. The Change Time stores the date and time when the versioned table information for each versioned table was last changed. The Row Create Time column stores the date and time when each versioned table was versioned.

A flowchart of an exemplary conflict resolution method in accordance with the present invention is shown in FIG. 3. Generally, every base table that is versioned includes a timestamp column that indicates when the most recent change to each row was committed. The timestamp is preferably a value that is maintained by the database management system. When a change is committed to the base table, the change is "stamped" with the timestamp value. When a change is made, the change is stored in the appropriate versioned table with the corresponding timestamp from the base table. If, when the change is submitted, the "stored" timestamp in the versioned table is equal to the "current" timestamp in the base table, then there is no conflict and the change is committed. If, however, the stored timestamp is not equal to the current timestamp, then there is a conflict. The user may choose to merge and commit the conflicting changes. The user may also choose to rollback and not commit the conflicting changes. The database management system may also be preset to automatically merge changes or to rollback changes.

As shown in FIG. 3, at step 310, changes and their corresponding timestamps are stored in the appropriate versioned tables 220-224. Insertions are stored in version add table 220, modifications are stored in version modify table 222, and deletions are stored in version delete table 224. The timestamp for insertions is 0x0000 because insertions are not present in base table 210. The timestamp for modifications and deletions is their corresponding timestamp from base table 210. For example, as shown in Table 3, in version 3, row 105 is added, row 102 is modified, and row 101 is deleted. Added row 105 is stored in Table 2 with timestamp 0x0000. Modified row 102 is stored in Table 3 with timestamp 0x0002 from row 102 in Table 1. Deleted row 101 is stored in Table 4 with timestamp 0x0002 from row 101 in Table 1.

At step 312, a version is submitted. All changes made in a version will preferably be submitted as part of a single transaction. For example, at timestamp 0x0008, version 3 may be submitted to base table 210 shown in Table 7. As shown in Tables 2-4 above, when version 3 is submitted, added row 105 will be submitted, modified row 102 will be submitted, and deleted row 101 will be submitted.

At step 314, it is determined whether each row's timestamp stored at step 312 is equal to the row's current timestamp in base table 210. If a submitted row is not present in base table 210, then the row's current timestamp is set to 0x0000. For example, when added row 105 is submitted, its stored timestamp 0x0000 is equal to its current timestamp 0x0000. When modified row 102 is submitted, its stored timestamp 0x0002 is not equal to its current timestamp 0x0005 from Table 7. When deleted row 101 is submitted, its stored timestamp 0x0002 is equal to its current timestamp 0x0002 from Table 7.

If, for every change in the version, the stored timestamp is equal to the current timestamp, then there are no conflicts and, at step 322, the version is committed. The version will preferably be committed only if there are no conflicts present in any of the submitted changes. A single conflict for any change in the transaction will preferably stop the entire transaction.

If, for any change in the version, the stored timestamp is not equal to the current timestamp, then a conflict is present, and, at step 316, the transaction is stopped and an alert may be generated by DBMS 200. The alert may state that conflicts are present, specify the conflicting rows, and display the committed conflicting rows and the submitted changes. For example, when version 3 is submitted, an alert may state that there is a conflict present in modified row 102. As should be appreciated, although row 102 was modified in version 3 before it was modified in version 2, is still a conflict present because version 2 was submitted before version 3.

At step 318, it is determined if the user of the submitted version prefers to merge and commit the conflicting changes or to rollback and not commit the conflicting changes. For example, the user of version 3 may choose to merge row 102 to {102, Charles, Portland}, as currently stored in Table 7. The user of version 3 may also choose to rollback conflicting changes and not commit the transaction. DBMS 200 may also be configured to eliminate step 318 and to automatically resolve conflicts by merging conflicting changes or rolling back conflicting changes.

If the user chooses to merge changes, then, at step 320, the changes are merged and, at step 322, the submitted version is committed with the merged changes. If the user chooses not to merge changes, then, at step 326, the changes are rolled back. As should be appreciated, the user may choose to merge or rollback conflicts on a row by row basis. For example, the user may choose to merge some conflicts while rolling back others.

At step 324, the timestamp of the committed changes is set to the timestamp of DBMS 200. An exemplary base table 210 at timestamp 0x0009 after version 3 is committed is shown in Table 10 below:

TABLE 10

Exemplary Base Table (at Timestamp = 0x0009)

| BUYER ID | NAME | CITY | TIMESTAMP |
|---|---|---|---|
| 100 | | | 0x0008 |
| 101 | | | 0x0009 |
| 102 | Charles | Portland | 0x0008 |
| 103 | Betty | Boston | 0x0002 |
| 104 | Mike | Miami | 0x0008 |
| 105 | Phil | Philadelphia | 0x0009 |

As shown in Table 10, the user of version 3 has chosen to merge row 102 to {102, Charles, Portland}. Furthermore, row 105 has been added, row 102 has been modified, and row 101 has been deleted to reflect the changes made in version three. The timestamp of each such change is set to 0x0009 to reflect the timestamp value when they are committed.

While the present invention has been described in connection with the preferred embodiments of the various figures, it is to be understood that other similar embodiments may be used or modifications and additions may be made to the described embodiment for performing the same function of the present invention without deviating therefrom. For example, while the present invention is described in terms of a base table with three versions, a base table may have any number of versions. Therefore, the present invention should not be limited to any single embodiment, but rather should be construed in breadth and scope in accordance with the appended claims.

I claim:

1. A method for conflict resolution in a versioned database, the method comprising:
    generating a set of three separate versioned tables for a corresponding version of the database, the set of three separate versioned tables comprising a version insert table, a version delete table, and a version modify table, whereby each data element that is inserted in the corresponding version is stored in the version insert table, each data element that is deleted in the corresponding version is stored in the version delete table, and each data element that is modified in the corresponding version is stored in the version modify table;
    storing a changed data element and a corresponding timestamp of a base table in one of the versioned tables;
    submitting the changed data element to the base table;
        if the stored timestamp is equal to a current timestamp of the base table, committing the changed data element to the base table; and
        if the stored timestamp is not equal to a current timestamp of the base table, generating an alert indicating that a conflict is present.

2. The method of claim 1, further comprising setting the timestamp corresponding to the committed change to a value maintained by a database management system.

3. The method of claim 1, wherein generating said alert indicating that the conflict is present comprises displaying the committed data element and the submitted data element.

4. The method of claim 1, wherein storing the changed data element comprises storing the inserted data element in the insert table.

5. The method of claim 1, wherein storing the changed data element comprises storing the modified data element in the modify table.

6. The method of claim 1, wherein storing the changed data element comprises storing the deleted data element in the delete table.

7. A system for database versioning, the system comprising:
    a processor operative to execute computer executable instructions; and
    a database management system comprising:
        a base table for storing committed data elements;
        a set of three separate versioned tables for storing data elements changed in a corresponding version of data elements, the set of three separate versioned tables comprising a version add table for storing inserted data elements, a version modify table for storing modified data elements, and a version delete table for storing deleted data elements; and a version view for displaying the corresponding version of data elements, whereby the version view table reconstructs the data stored in the base table and the set of three separate versioned tables to provide an external view of the corresponding version of data elements.

8. The system of claim 7, wherein the database management system further comprises:

a memory having stored therein computer executable instructions for performing the following steps:

storing in one of the set of versioned tables a changed data element and a corresponding timestamp of the base table;

submitting the changed data element to the base table;

if the stored timestamp is equal to a current timestamp of the base table, committing the changed data element to the base table; and if the stored timestamp is not equal to a current timestamp of the base table, determining whether to commit the changed data element to the base table.

9. The system of claim 8, wherein the memory further comprises computer executable instructions for performing the step of setting the timestamp corresponding to the committed change to a value maintained by the database management system.

10. The system of claim 8, further comprising a display for displaying a conflict alert.

11. The system of claim 10, wherein the memory further comprises computer executable instructions for performing the step of if the stored timestamp is not equal to the current timestamp of the base table, then displaying the committed data element and the submitted data element to the user.

12. A computer readable storage medium having stored thereon computer readable instructions for performing the following steps:

generating a set of three separate versioned tables for a corresponding version of a database, the set of three separate versioned tables comprising a version insert table, a version delete table, and a version modify table, whereby each data element that is inserted in the corresponding version is stored in the version insert table, each data element that is deleted in the corresponding version is stored in the version delete table, and each data element that is modified in the corresponding version is stored in the version modify table;

storing a changed data element and a corresponding timestamp of a base table in one of the versioned tables;

submitting the changed data element to a base table;

if the stored timestamp is equal to a current timestamp of the base table, committing the changed data element to the base table; and if the stored timestamp is not equal to a current timestamp of the base table, generating an alert indicating that a conflict is present.

13. The computer readable medium of claim 12, wherein the computer readable instructions are for further performing the step of setting the timestamp corresponding to the committed change to a value maintained by a database management system.

14. The computer readable medium of claim 12, wherein generating said alert indicating that the conflict is present comprises displaying the committed data element and the submitted data element.

15. The computer readable medium of claim 12, wherein storing a changed data element comprises storing an inserted data element in the insert table.

16. The computer readable medium of claim 12, wherein storing a changed data element comprises storing a modified data element in the modify table.

17. The computer readable medium of claim 12, wherein storing a changed data element comprises storing a deleted data element in the delete table.

* * * * *